US009200950B2

(12) United States Patent
Lian et al.

(10) Patent No.: US 9,200,950 B2
(45) Date of Patent: Dec. 1, 2015

(54) PULSED PLASMA MONITORING USING OPTICAL SENSOR AND A SIGNAL ANALYZER FORMING A MEAN WAVEFORM

(71) Applicants: Lei Lian, Freemont, CA (US); Quentin Walker, Freemont, CA (US); Dermot Cantwell, Sunnyvale, CA (US)

(72) Inventors: Lei Lian, Freemont, CA (US); Quentin Walker, Freemont, CA (US); Dermot Cantwell, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 100 days.

(21) Appl. No.: 14/189,536

(22) Filed: Feb. 25, 2014

(65) Prior Publication Data

US 2015/0241272 A1  Aug. 27, 2015

(51) Int. Cl.
G01J 1/32 (2006.01)
G01J 1/42 (2006.01)

(52) U.S. Cl.
CPC ............ *G01J 1/42* (2013.01); *G01J 2001/4238* (2013.01)

(58) Field of Classification Search
CPC . G01J 1/42; H01J 37/32137; H01J 37/32009; H01J 2237/334
USPC .............................. 250/205, 221, 239, 214.1; 438/707–729; 156/345.24–345.49; 324/96, 459
See application file for complete search history.

(56) References Cited

U.S. PATENT DOCUMENTS

| 5,989,928 | A | * | 11/1999 | Nakata et al. ..................... 438/7 |
| 6,231,774 | B1 | | 5/2001 | Saito |
| 6,627,463 | B1 | | 9/2003 | Sarfaty |
| 2008/0026133 | A1 | | 1/2008 | Fang et al. |

FOREIGN PATENT DOCUMENTS

| JP | 2001-319924 | 11/2001 |
| KR | 10-0473856 | 3/2006 |

OTHER PUBLICATIONS

PCT/US2015/014279, "Notification of Transmittal of the International Search Report and the Written Opinion of the International Searching Authority, or the Declaration" mailed May 21, 2015, pp. 12.

* cited by examiner

*Primary Examiner* — Que T Le
(74) *Attorney, Agent, or Firm* — Blakely, Sokoloff, Taylor & Zafman LLP

(57) ABSTRACT

Monitoring of a pulsed plasma is described using an optical sensor. In one example, the invention includes receiving light emitted by a pulsed plasma in a semiconductor plasma processing chamber, sampling the received light at a sampling rate higher than a pulse rate of the pulsed plasma, wherein the sampled light has a periodic amplitude waveform and the sampling rate is higher than the period of the amplitude waveform, accumulating multiple sampled waveforms to form a mean waveform, and transmitting characteristics of the mean waveform to a chamber control tool.

20 Claims, 4 Drawing Sheets

PULSED PLASMA MONITORING USING OPTICAL SENSOR AND A SIGNAL ANALYZER FORMING A MEAN WAVEFORM

FIELD

The present description relates to the field of semiconductor wafer processing and, in particular, to measuring the plasma response.

DISCUSSION OF RELATED ART

In the production of semiconductor devices a plasma process is used within a chamber to form different layers and devices on a wafer. The wafer is then diced to form individual semiconductor chips. The plasma is generated using single or mixed gases and high power RF (Radio Frequency) energy.

Even though a plasma etch process with RF power delivered in CW mode has been commonly used in the semiconductor manufacturing during the past decades. Pulsed plasma is now being used more often in etch process chambers in order to reduce damage to the wafer caused by the plasma and to better control the etching profile. Pulsed plasma is also able to be controlled more precisely which allows the amount of etching to be controlled more precisely. These factors become more important as the technology node continues to shrink.

In order to control the plasma more precisely, the plasma is monitored by observing its optical emission through a window on the plasma chamber. Traditional Optical Emission Spectroscopy (OES) measures the mean optical emission from the plasma with a sampling frequency ranging from 100 Hz to 10 s. This information from the samples is gathered together and can be displayed on a graph. The many samples accumulated by the photon detector over some amount of time, such as 0.1 seconds, provides a higher signal to noise ratio by averaging out noise over time. The traditional OES signal is correlated to the density of certain species of plasma gases when the gases are in an excited state. Therefore, traditional OES has been commonly used during plasma etch process to monitor the process condition and the progress of the process.

SUMMARY

Monitoring of a pulsed plasma is described using an optical sensor. In one example, the invention includes receiving light emitted by a pulsed plasma in a semiconductor plasma processing chamber, sampling the received light at a sampling rate much higher than a pulse rate of the pulsed plasma, wherein the sampled light has a periodic amplitude waveform and the sampling rate is much higher than the period of the amplitude waveform, accumulating multiple sampled waveforms to form a mean waveform, and transmitting characteristics of the mean waveform to a chamber control tool.

BRIEF DESCRIPTION OF THE DRAWINGS

Embodiments of the present invention are illustrated by way of example, and not limitation, in the figures of the accompanying drawings.

DETAILED DESCRIPTION

The plasma's response to the pulse signal generated by the RF plasma power source may be monitored at a higher frequency to obtain more information about the plasma. This information may be used to ensure process stability and enhance chamber to chamber matching among other purposes. The plasma emission during each pulse cycle may be monitored by using a high speed optical sensor with a sampling frequency up to hundreds of KHz or MHz. The waveform generated by the high speed optical sensor provides useful information about the dynamic response of the plasma such as the pulsing frequency, the duty cycle, and the transient behavior during the rise and fall of the RF power. The analysis of these waveforms may be used to monitor plasma conditions, control process endpoints, perform calibrations and perform chamber matching in a series of plasma reactors.

A methodology is described herein to resolve an optical response of a pulsed plasma in the time domain by using a fast optical detector. The fast optical detector generates a large quantity of data so this data is made useful for semiconductor fabrication equipment by first analyzing the data as it is received, detecting faults, and then transmitting only an abstract of the data and any fault alerts to a fabrication chamber control system.

In some embodiments, a plasma optical emission signal is used to monitor a pulsed plasma. A sensor module collects the monitoring data at high speed and detects any faults. The sensor module may apply mean centering and/or normalization on the fly to reduce pulse variation caused by thermal drift and sensor to sensor variations. Fault detection codes (FDC) are sent to a control system or analysis tool. In addition parameters of the monitored pulses are sent to the tool. These parameters may include a mean waveform over the reporting period, the pulsing frequency and the duty cycle values extracted from the optical signal.

The parameters are sent at a rate that is much lower than the rate at which the pulses are sampled. The lower transmission rate accommodates the rate at which other chamber data is collected, processed, and stored. In some embodiments, In addition to pulse plasma monitoring the sensor module may also provide general validation that the plasma is on.

Figure 1:
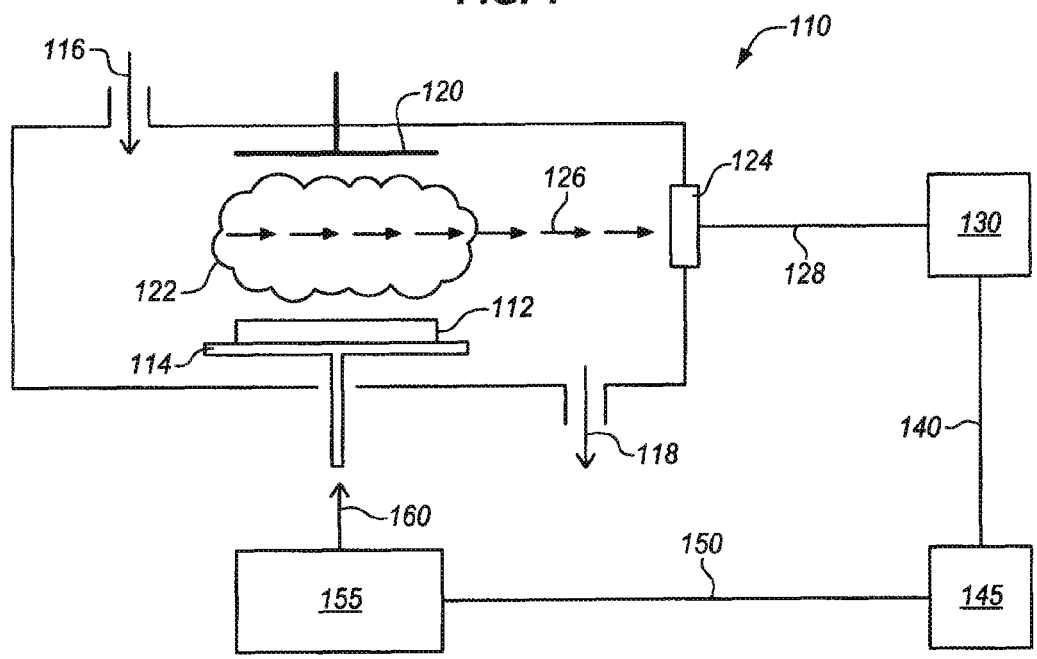
FIG. 1 is a diagram of a wafer processing chamber with a plasma monitoring sensor module according to an embodiment of the invention.

FIG. 1 is an overview diagram of a plasma processing chamber, monitoring, and control system. A plasma chamber 110 has a wafer 112, such as a silicon substrate, or some other workpiece on a carrier 114. The chamber has an inlet 116 and an outlet 118 to control the gaseous environment within the chamber. An RF power supply 120 is used to energize a plasma 122. The energized plasma emits an optical signal 126, a portion of which is transmitted through a window 124 in the chamber. This light is then carried through an optical carrier, such as an optical fiber 128 to a sensor module 130.

The sensor module receives the optical signal through the optical channel 128 and analyzes it. The analysis of the optical signal is then sent through a data connection 140 to a chamber control tool 145. The control tool determines processing parameters based on the data, determines actions based on any received FDC, and stores records. The control tool may be coupled to many different processing chamber sensor modules, depending on the particular implementation. The control tool is coupled through a data connection 150 to a chamber controller 155. The chamber controller implements any processing chamber adjustments through one or more control interfaces 160 to the chamber. Through this loop, conditions monitored through the optical sensor can be analyzed in the control tool and be compensated for or adjusted through the tool controller. Any resulting changes will be observed by the system and appropriate adjustments may be made, if necessary.

Figure 2:
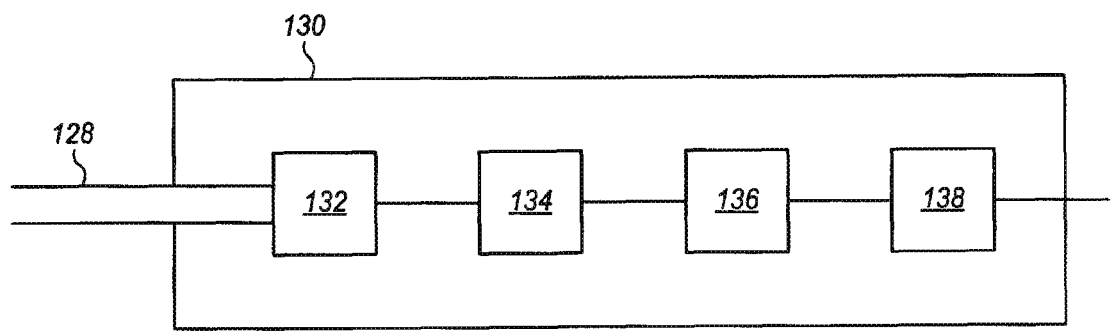
FIG. 2 is a block diagram of an optical plasma monitor sensor portion of a process chamber with an optical fixture according to an embodiment of the invention.

FIG. 2 is a block diagram of the sensor module. The sensor module 130 receives the optical signal through the optical connector 128 coupled to the window of the chamber. The optical signal is converted to a voltage by a photodetector 132. The voltage is coupled to a digitizer such as a sample and hold circuit or analog to digital converter 134 to produce a digital representation of the received optical waveforms. The digitizer is coupled to a signal analyzer 136 to detect faults and to average waveform parameters. This information is then converted by a communications interface 138 into a form suitable for processing by the control tool 145. In one example the data is packetized and transmitted over a data packet network interface, such as Ethernet or EtherCAT, to the control tool.

The sensor module receives the light emitted by the plasma. This light may be in a range of from 200 nm to 1200 nm or more. The photodetector may have an optical band pass filter to limit the range of wavelengths as desired. The specific wavelengths may be adapted to suit a particular plasma. The digitizer samples the converted optical signal at a rate that is significantly higher than the frequency of the RF plasma power supply. In current plasma processing chambers, the plasma may be pulsed at a rate of 0.0 to 10 kHz. The sensor module digitizer may sample the optical signal at a rate that is much higher, for example 100 times higher or up to some number of MHz. For this the photodetector is selected to have a quick response time for a MHz sample rate. The digitizer, similarly, has a sufficiently quick sampling circuit and feeds the stream of samples to the signal analyzer.

The signal analyzer 136 receives the samples, stores them temporarily in a buffer and accumulates the samples. The signal analyzer combines data for signals collected over one report period and sends a combined data set to the control tool at a much lower report rate. In some embodiments, the data is sent at a rate of 10 Hz or less. A rate of about 10 times per second is more than adequate to allow the control tool to respond to changes in the processing chamber.

The signal analyzer collects the samples and analyzes it to determine the period of the waveform. Samples are then averaged for each successive waveform to accumulate a composite waveform. If the reports are made at a rate that is approximately 1000 times slower than the rate at which the plasma is pulsed, then approximately 1000 waveforms may be accumulated or combined to form a single composite waveform to send to the control tool. While 1000 waveforms may be combined it may be sufficient to combine only 100 or less. This allows ample time to perform statistical analysis on the composite waveform, perform fault detection, flush the sample buffer, and assemble a data packet to send to the control tool through the communications interface 138.

The samples may be accumulated in a variety of different ways. The samples may be correlated based on the period of the waveform and then all samples at a corresponding point on the waveform may be averaged to form an average waveform shape. The samples may be charted as successive waveforms through interpolation and then the interpolated waveforms may be averaged. An interpolation approach may be used to compensate for drift in the sampling rate or the plasma pulse frequency. A variety of other techniques may alternatively be used, depending on the particular implementation. Having established a mean waveform using these or any other averaging or other statistical methods, the signal analyzer may determine parameters of the mean waveform. This may be done as part of forming the mean waveform or after the mean waveform has been determined. The parameters may include the amplitude, maximum, minimum, period, a slope such as rising and falling slopes, etc. These parameters may be parameters of the mean waveform or means of the parameters of each of the sampled waveforms.

For FDC, the signal analyzer may generate a fault data packet that includes a description of the error, such as a code. The fault data packet may also include a time stamp and a description of the waveform that generated the error. The fault data packet may also or alternatively, include samples of the waveform that generated the fault code. This allows the control tool to fully analyze the fault and determine an appropriate corrective action. In some embodiments, a fault detection code, the offending waveform, and the five waveforms before and after the offending waveforms are sent in the data packet.

Faults and corresponding FDC's may be defined in advance based on specific deviations of some parameters of a pulse within any one pulse period. This may be based on the raw pulse data or on the combined data that is produced by the signal analyzer for a particular data reporting interval. A fault may be based on any visually apparent difference between a cycle and the most recently recorded single-period average signal. Such a difference might be observed if the two signals were overlaid on the same graph. Such a difference may also be detected by extracting parameters of the signals, such as minimum, maximum, and cycle time and comparing these parameters. Such faults may include intensity variations during a portion of a cycle. Another fault may be an arc producing a high signal for a few samples during a cycle and a corresponding distortion of a pulse.

The signal analyzer may store parameters of waveforms in a buffer to compare with later waveforms to determine whether there are any variations. The amount of the variations may be compared to a threshold. The threshold may be used as a standard to assess the amount of the variations. If the variations are large, then a corresponding FDC may be generated. In addition or as an alternative, the signal analyzer may have a stored set of reference waveform parameters or a stored set of acceptable value ranges for the parameters. The signal analyzer may then compare the received waveforms to the standard to determine whether to declare a fault.

In one embodiment, the offending waveform and the five waveforms before and after the offending waveform are sent as a pulsed waveform error message. Multiple faults of the same type may be summarized by sending a fault code only for each unique fault.

A reported data-derived fault may be determined as a fault detected as a deviation of some measurements from within any one pulse period from the single-period averaged pulse calculated from the associated data reporting interval. Data-derived faults may be considered as separate from hardware related faults such as temperature sensing faults and faults from dropped data. A data-derived fault may be considered to be any visually apparent difference between a cycle and the most recently recorded single-period average signal. The period may correspond to tens or hundreds of waveforms.

In one embodiment, data-derived faults and any other faults not reported until the end of each data interval. After the data interval ends, a flag associated with a data-derived fault may be set and transmitted. To reduce data transmission, multiple flags may be sent but only the data associated with the first fault detected in any data interval is transmitted. Fault detection may also be limited to the first fault in any one data interval. The chamber control tool may then determine how to manage each reported fault. The tool may manage the severity of each fault as well.

The table shows a list of possible faults that may be reported as an FDC in the left column and then for each fault whether waveforms are sent together with the FDC.

TABLE

| Condition | Send Waveform |
|---|---|
| Saturated signal (>XX V) | |
| Missed pulse (one pulse) | Yes |
| Pulse frequency deviation (minimum of +/−1% or +/−10 Hz) | Yes |
| HW Sensor initial warm-up | |
| HW Sensor module disconnected from the digitizer | |
| HW Sensor Overheating | |
| HW Digitizer Overheating | |
| HW Dropped Data | |

Figure 3:
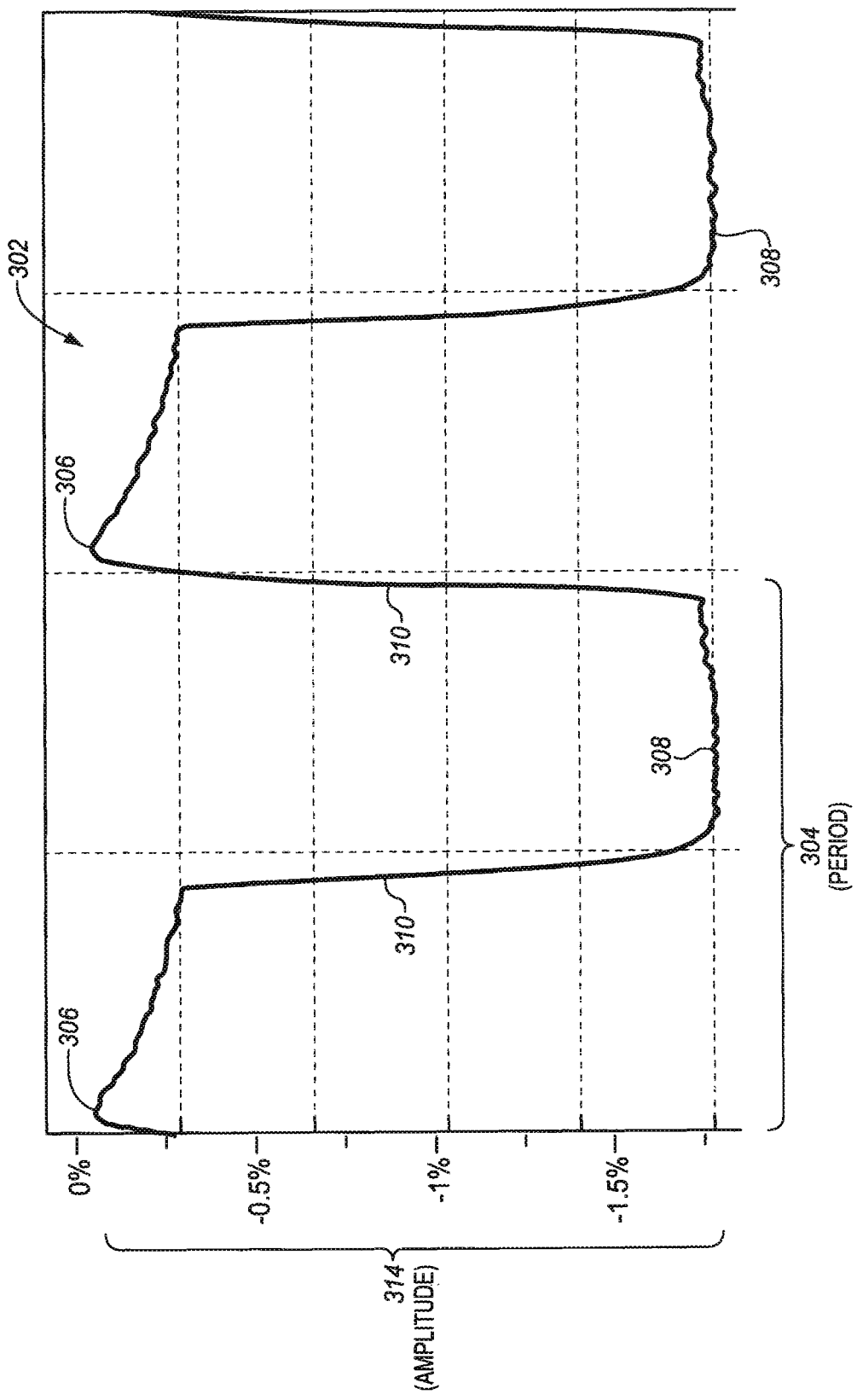
FIG. 3 is an example of an optical waveform that may be emitted by a plasma according to an embodiment of the invention.

FIG. 3 is an example of a waveform that may be observed by a high frequency optical detector through the window of a pulsed plasma etch process chamber. In FIG. 3 the optical detector converts the received amplitude into electrical signals. These may be sampled over time to produce a waveform as shown in FIG. 3. The waveform 302 has a period 304 of from 1 to 10 kilohertz and an amplitude 314 shown in this diagram as going from approximately 0 percent at a peak 306 to minus 1.8 percent at a minimum 308. By sampling the waveform 302 at a much higher rate than the period of the waveform, details of the waveform may be obtained. These include the maximum 306, the minimum 308, the period 304, the nature of the slope 310, and details of over shoot spikes at the maximum and under shoots at the minimum.

All of these parameters of the waveform may be accumulated over some number of waveforms and then sent to the control tool. The waveform of FIG. 3 represents two cycles of the plasma pulse waveform, however, an accumulated, averaged, or mean waveform may look very similar. In this case, the period of the waveform 304 may be approximately 10 kilohertz and the accumulated average of waveforms may be sent for example every 5 or 10 times per second. The transmitted waveform data may therefore represent an average of as many as 1000 individual cycles of the pulsed plasma waveform.

Figure 4:
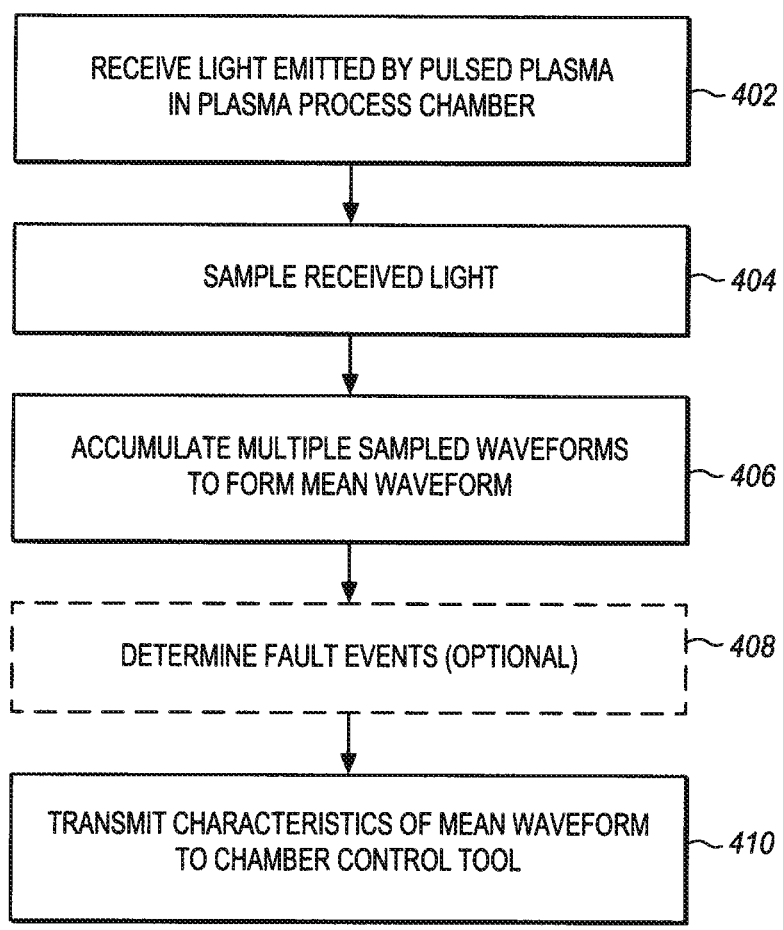
FIG. 4 is a process flow diagram of monitoring a plasma using an optical sensor according to an embodiment of the invention.

FIG. 4 is a process flow diagram of the operations performed by the optical detector 130 of FIG. 2. At 402 the light emitted by the pulsed plasma in the plasma process chamber is received at the detector. At 404 this received light is sampled. The received light may be sampled at a rate 100 or more times faster than the period of the amplitude waveform. The specific sampling rate may depend on the particular implementation. Considering the example waveform of FIG. 3, a sample rate 5 or 10 times higher than the period of the waveform will reveal many of the characteristics of the waveform. However, for higher precision a much higher waveform sampling rate may be used. This higher precision allows for a larger number of fault conditions to be understood and for plasma generator characteristics to be more clearly shown.

At 406 the sample waveforms are accumulated to form a mean waveform. This mean waveform may be analyzed for fault events and to determine its parameters. The parameters that can be determined include its amplitude, the period of the mean waveform the slope of the mean waveform the minimum and maximum of the mean waveform and its over shoots and its under shoots. All of these characteristics may be compiled and transmitted to the control tool.

The characteristics may also be used to determine if there are any fault events. At 408 optionally, the mean waveform is analyzed for fault events and if any fault event is determined, then a fault code is transmitted to the chamber control tool. Fault events may be determined by comparing the parameters to a stored set of parameters. The stored set of parameters may be for example those parameters which correspond to proper or correct waveforms. Alternatively the fault codes may be generated by comparing the new mean waveform to previous mean waveforms. Individual sampled waveforms may also or alternatively be evaluated for fault conditions. As a result, if the nature of the waveform changes over time this may be identified and flagged to the control tool.

At 410 the characteristics of the mean waveform are transmitted to the chamber control tool. The transmitted characteristics may include a code and a time stamp in a data packet. The characteristics may include any fault events that are determined. The characteristics may also include parameters of the mean waveform and samples of the mean waveform. So for example instead of sending a set of amplitude data for each waveform, by accumulating a large number of waveforms together, and taking an average of the amplitude data, the amplitude data for this mean waveform may be transmitted instead. If a mean waveform is transmitted several times a second, the control tool will have sufficient information to evaluate changes and parameters of the pulsed plasma. The fault codes may be sent together with the specific parameters of the mean waveform. A specific real time waveform that results in the fault may also be sent.

In one example, while the detector is in normal operation it sends only mean waveforms and parameters of mean waveforms. When a fault event is detected, the actual real time waveforms may also be sent together with the accumulated mean waveform. If a particular waveform is detected to have a fault then one or more waveforms before and after that waveform may also be sent. This amount of data may be larger than the amount of data sent, however, this more detailed information is available to the detector and will help to analyze the nature of the fault. The detector continues to sample waveforms to accumulate samples over some number of samples and then to transmit the characteristics of the mean waveform to the chamber control tool while the chamber is in operation.

The sensor may operate in two or more modes. The sensor may be used to detect and analyze a pulsed plasma. The sensor may also be used to determine whether the plasma is on. In plasma on detection mode the sensor may be configured to report data every data interval. As described herein, the plasma's optical emission signal is used to monitor the pulsed plasma. The sensor provides high speed data collection and fault detection for any of a variety of different fault scenarios. At the same time, while the data collection and fault detection are at high speed, accumulated data is sent at a lower speed to the chamber control or analysis tool. Key pulsing related parameters, a mean waveform, and FDC indicators are sent to the tool at much lower sampling rate (~10 Hz). This more closely resembles that rate at which other data is collected for the tool and reduces the amount of data that is stored by the tool. Thermal drift and sensor to sensor variations are addressed by averaging the waveforms over time.

The photodetector 132 and digital to analog converter 134 return a set of amplitude samples over time. In order to analyze waveforms and compare pulses, the pulses are extracted from the amplitude data. This may be done in any of a variety of different ways. In one example, a rate-of-change (first derivative or dx/dy) approach is used to extract the pulse signal from the raw amplitude data.

Figure 5:
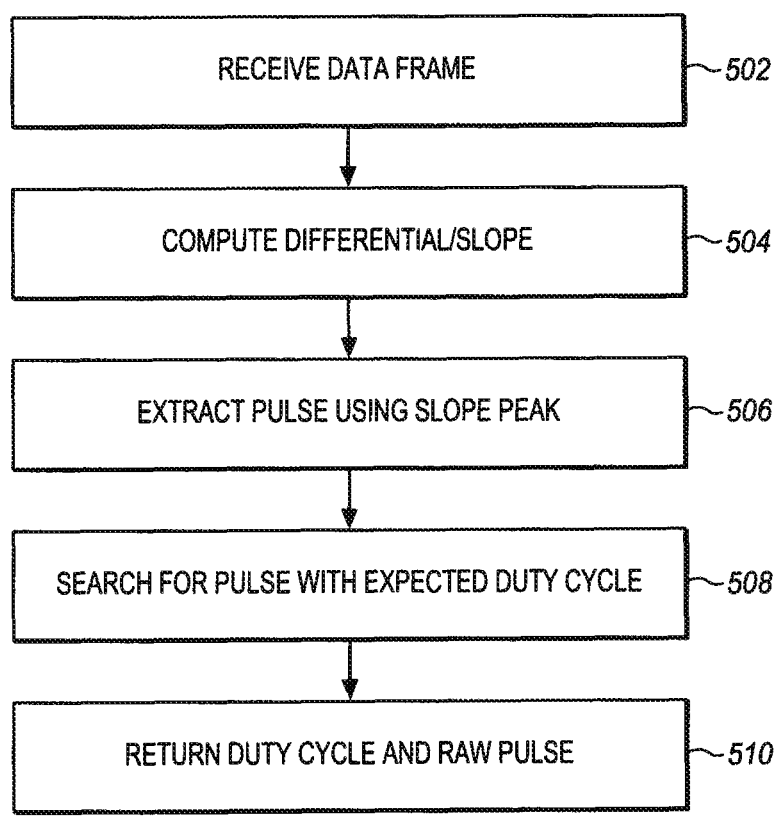
FIG. 5 is a process flow diagram of analyzing a plasma pulse waveform from an optical sensor according to an embodiment of the invention.

FIG. 5 is a simplified process flow diagram of an approach that may be used, for example, to analyze a single 100 mS data frame. Such a process may be used to find waveforms within the received signal and then determine period, slope, and peaks. First at 502 the signal is received. This may be the direct raw signal from the photodetector or an average signal. Next at 504 the rate of change of the signal (dx/dy) is computed. This provides the slope of the signal on a horizontal time axis. Using this differentiated signal, the peaks are extracted at 506 based on the expected number of cycles in the data frame. The expected number of cycles may be equal to (100 mS/Pulse Frequency).

An estimate of the pulse signal may then be constructed based on the slope and peak information. After a pulse is found, a single pulse may be extracted that matches the expected duty cycle or expected period. A search at 508 for a single pulse that matches the desired duty-cycle may then be used to find additional pulses during the sample period. By first searching for a single pulse, potential bad pulses in the data frame may be ignored. Alternatively, a search can be conducted for all pulses, but this reduces the accuracy.

In some embodiments, leading and trailing edges may be searched. However, this is difficult for complex waveform patterns such as the one shown in FIG. 3. The position of the leading and trailing edges is not well or precisely defined in such a waveform. It may therefore be easier to match a pulse match with an expected duty cycle. The pulse may also be compared with the immediately preceding and succeeding pulse for the expected duty cycle. After the estimation is finished the duty cycle and the found raw pulse are returned at 510 for signal analysis. This may be used to form a mean waveform at 406, to determine fault events at 408, or to transmit the characteristics to another tool at 410.

As mentioned herein the pulse detection and error detection may be performed directly on the raw high sample rate data from the digital to analog converter or on an averaged signal. In some embodiments, the duty cycle may be detected based on the fact that a state change in the RF pulse (positive to negative or negative to positive) will induce a similar state change on the OES (Optical Emission Spectroscopy) signal that is received at the sensor module. However, the actual pulse is buried in noise, so a representation of the pulse is extracted using estimation techniques. The estimation may be made using a differential (dx/dt) of the OES signal with respect to time, to extract the state changes. The differentiated signal should exhibit peaks at the state changes.

For the raw signal, the input signal is the raw signal from the photodetector and converter. The input data is assumed to be received at a fixed rate (for example, 100 ms) and the expected number of cycles (n) in the fixed data frame is known.

To find the pulses, the input data frame is differentiated and the resulting signal is sorted in descending order. Using the expected number of cycles (n) an estimate is made of the state change thresholds or signal peaks. Transition1 may be defined as the largest high-low threshold. Transition2 may be defined as the smallest low-high threshold. A representative pulse train may then be built using these thresholds and the differentiated signal.

If the differentiated signal is greater than transition1, then the pulse train is 1. If the differentiated signal is greater than the value for transition2, then the signal is 0. When the signal is in between these two transitions, the signal remains at the previous value. In this way, a representative pulse train may be built based on the input signal.

To extract the duty cycle a search is conducted for a single pulse that matches the expected duty cycle. After one such pulse is found, the actual duty cycle of the found pulse is measured. The returned value is the measured duty cycle for that single pulse.

Alternatively, an averaged signal may be used. For the averaged signal, a search may be made for a single pulse in the input data frame. This approach also works on the principle of state changes. The input signal is a differentiated signal as before. The absolute value of this signal is then taken. A search is then made for the largest positive peak and the largest negative peak since there is only one pulse being searched. The locations of these two peaks are detected in the differentiated signal. The peaks checked to ensure that they are sufficiently separated to signify a pulse. Otherwise two close peaks may cause a false reading. If the peaks are accepted, then the duty cycle is computed by computing the difference in the peaks over the total number of samples in the data frame. Since the direction of the state change is not known, there are two possible values for the duty cycle. The computed duty cycle and its inverse or 1—the computed duty cycle.

In this description, numerous details are set forth, however, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "one embodiment" means that a particular feature, structure, function, or characteristic described in connection with the embodiment is included in at least one embodiment of the invention. Thus, the appearances of the phrase "in an embodiment" or "in one embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" my be used to indicate that two or more elements are in either direct or indirect (with other intervening elements between them) physical, optical, or electrical contact with each other, and/or that the two or more elements co-operate or interact with each other (e.g., as in a cause an effect relationship).

In the following description and claims, the terms "chip" and "die" are used interchangeably to refer to any type of microelectronic, micromechanical, analog, or hybrid small device that is suitable for packaging and use in a computing device.

It is to be understood that the above description is intended to be illustrative, and not restrictive. For example, while flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A method comprising:
    receiving light emitted by a pulsed plasma in a semiconductor plasma processing chamber;
    sampling the received light at a sampling rate higher than a pulse rate of the pulsed plasma, wherein the sampled light has a periodic amplitude waveform and the sampling rate is higher than the period of the amplitude waveform;
    accumulating multiple sampled waveforms to form a mean waveform; and
    transmitting characteristics of the mean waveform to a chamber control tool.

2. The method of claim 1, wherein the characteristics comprise amplitude, period, and slope.

3. The method of claim 1, further comprising repeating forming a mean waveform for subsequent multiple sampled waveforms and repeating transmitting characteristics, wherein transmitting characteristics comprises transmitting characteristics of each new mean waveform at a rate lower than the pulse rate.

4. The method of claim 1, wherein sampling the light comprises sampling the received light at a sampling rate 100 times higher than the period of the amplitude waveform.

5. The method of claim 1, further comprising analyzing the mean waveform for fault events and if a fault event is determined, then transmitting a fault code to the chamber control tool.

6. The method of claim 5, wherein transmitting a fault code comprises transmitting a code and a time stamp in a data packet.

7. The method of claim 6, wherein transmitting a fault code comprises sending characteristics of the waveform that caused the fault event to be determined together with characteristics of waveforms before and after the fault event was determined.

8. The method of claim 5, wherein analyzing the mean waveform comprises determining parameters of the mean waveform and comparing the parameters to stored parameters.

9. The method of claim 1, wherein sampling the received light comprises converting the light to an electrical signal and sampling the electrical signal using a sample and hold circuit.

10. An apparatus comprising:
    a photodetector to receive light emitted by a pulsed plasma in a semiconductor plasma processing chamber;
    a digitizer to sample the received light at a sampling rate higher than a pulse rate of the pulsed plasma, wherein the sampled light has a periodic amplitude waveform and the sampling rate is higher than the period of the amplitude waveform;
    a signal analyzer to accumulate multiple sampled waveforms to form a mean waveform; and
    a communications interface to transmit characteristics of the mean waveform to a chamber control tool.

11. The apparatus of claim 10, wherein the characteristics comprise a waveform comprising mean amplitudes for the accumulated multiple sampled waveforms.

12. The apparatus of claim 10, wherein the characteristics comprise amplitude, period, and slope.

13. The apparatus of claim 10, further comprising a signal analyzer to compare the accumulated waveforms to a analyzing the mean waveform for fault events and if a fault event is determined, then transmitting a fault code to the chamber control tool.

14. The apparatus of claim 10, wherein the signal analyzer assembles a data packet to send to the chamber control tool, the data packet comprising a fault code and a time stamp.

15. The apparatus of claim 14, wherein the data packet further comprises characteristics of the waveform that caused the fault event to be determined together with characteristics of waveforms before and after the fault event was determined.

16. An apparatus comprising:
    means for receiving light emitted by a pulsed plasma in a semiconductor plasma processing chamber;
    means for sampling the received light at a sampling rate higher than a pulse rate of the pulsed plasma, wherein the sampled light has a periodic amplitude waveform and the sampling rate is higher than the period of the amplitude waveform;
    means for accumulating multiple sampled waveforms to form a mean waveform; and
    means for transmitting characteristics of the mean waveform to a chamber control tool.

17. The apparatus of claim 16, wherein the means for accumulating further comprises means for analyzing the mean waveform for fault events and if a fault event is determined, then assembling a data packet with a fault code to be sent to the chamber control tool by the means for transmitting.

18. The apparatus of claim 17, wherein the means for analyzing determines parameters of the mean waveform and compares the parameters to stored parameters.

19. The apparatus of claim 17, wherein the means for analyzing determines parameters of the sampled periodic amplitude waveform and compares the parameters a selected waveform to the parameters subsequent waveforms.

20. The apparatus of claim 16, wherein the means for sampling converts the light to an electrical signal and wherein the means for sampling comprises a sample and hold circuit.

* * * * *